United States Patent Office 3,119,791
Patented Jan. 28, 1964

3,119,791
PROCESS FOR THE MANUFACTURE OF
POLYESTER RESINS
Giuseppe Messina, Limbiate, and Nicola de Pisapia, Milan, Italy, assignors to L.I.R.C. Laboratori Italiani di Ricerca Chimica, Milan, Italy, a joint-stock company of Italy
No Drawing. Filed Nov. 16, 1959, Ser. No. 853,015
Claims priority, application Italy Jan. 12, 1959
3 Claims. (Cl. 260—75)

This invention relates to a process for the manufacture of polyester resins consisting of polymers or copolymers of itaconic acid.

The process is characterized in that the methyl diester of itaconic acid is taken as a starting material, in place of the acid; then said diester is subjected to ester interchange with a glycol, and the resulting glycol ester is condensed to a polymer. In a particularly advantageous embodiment of the invention, the reaction is carried out in the presence of a saturated dibasic acid (or its anhydride). The ester interchange and polycondensation are carried out in a single step by heating in the presence of catalysts, while methyl alcohol and water are distilled off.

A polyester is thereby obtained which, according to the technique usually followed in processing polyester resins, is mixed with styrene or other vinyl monomers, as, e.g., methylstyrene, possibly with the addition of further components, such as methyl methacrylate, thus obtaining a liquid, viscous resin, with a long storage life, which is hardened when required again according to known technique in the desired shape, e.g., in a mold, or into thin films, by heating in the presence of a catalyst (usually an organic, and particularly a benzoyl, peroxide or hydroperoxide, or methylethylketone) and in the presence of an accelerator (usually a cobalt or manganese salt), thereby copolymerizing the polyester with the vinyl monomer.

The polymers obtained according to the invention have surprisingly better properties with respect to those obtained from itaconic acid, and comparable with those obtained from the monoester of itaconic acid. However, it has been found that the preparation of polyesters of itaconic acid, starting from the methyl diester thereof, occurs with great difficulties, owing to the slow rate of the ester interchange of diesters in the presence of glycols. When the dimethyl itaconate is subjected to ester interchange with a glycol (in the presence of a catalyst) and is then polycondensed, not only does the reaction proceed very slowly, but also intensely colored polymers are obtained, probably due to the formation of complex colored salts.

However, it has been unexpectedly found that if the reaction is carried out in the presence of saturated dibasic acids—and in particular of phthalic acid (as anhydride), adipic acid or isophthalic acid—a good reaction rate is obtained, and the final products are not deeply colored. Free radical catalysts are used, preferably aromatic sulphonic acids, such as p-toluenesulphonic acid or benzenesulphone acid, zinc, lead or magnesium oxides or borates, or boric acid. The results thus obtained are surprising and it must be surmised that a synergistic action occurs between the diester and the saturated acid or anhydride.

On the other hand, the final products thus obtained have better mechanical and electrical properties than those of the products obtained starting from itaconic acid and the polyester-styrene mixtures are more reactive if catalyzed and more stable in the absence of a catalyst.

The invention is carried into practice by mixing the diester of itaconic acid with the saturated dibasic acid (or anhydride) and with the glycol before the ester interchange. The dibasic acid forms the respective ester with the glycol used for the ester interchange, whereby linear copolymers are obtained in the polycondensation step. The ester interchange and the subsequent polycondensation already occur above 100° C. however temperatures in the range of from 150°–200° C., and particularly between 150° and 185° C. are preferred. The reaction lasts a few hours, at first under room pressure, then under a vacuum preferably to 600 mm. Hg, viz. to 160 mm. Hg residual pressure.

Ethyleneglycol, propyleneglycol, diethyleneglycol or mixtures thereof are preferably employed for the ester interchange. The ratio of itaconic acid, introduced as diester, to saturated dibasic acid, calculated as molar ratio, ranges from a minimum of 1:3 up to a maximum of 3:1. The glycol is added in molar quantities with respect to the sum of the two acids.

The invention will be better understood from the following examples given by way of illustration only:

*Example 1*

1,600 g. of dimethyl itaconate, 1,364 g. of ethyleneglycol and 7 g. of p-toluenesulphonic acid are brought into a three-neck, round bottomed flask, provided with a stirrer and with a distilling device, and heated in two hours to 150° C. The reaction mixture is then kept at temperatures in the range 150°–180° C. for 25 hrs. Methyl alcohol begins to distill off at 170° C. After the aforesaid time, a vacuum is gradually applied, to 600 mm. Hg, and the reaction mixture is kept at the temperature of 180° C. for a further 6 hrs. In the course of the whole reaction, 640 g. of methyl alcohol are distilled off. The reaction product is then cooled down to 80°–90° C., and styrene is mixed therewith, until a styrene content of 30% by weight is reached. A deep yellow, nearly red resin is thus obtained.

*Example 2*

1,600 g. of dimethyl itaconate, 1,364 g. of ethyleneglycol, 1,480 g. of phthalic anhydride and 7 g. of p-toluenesulphonic acid are put into the flask of Example 1. The mass is then heated 1 hr., to 130° C., at which temperature water and methanol begin to be distilled off. The reaction mixture is kept at temperatures in the range 130°–180° C. for 8 hrs., under room pressure; then a vacuum is applied, to 600 mm. Hg, and the reaction mixture is kept under such vacuum for 4 hrs. A total of 760 g. of methanol-water mixture is distilled off in the course of the reaction. The polyester, after cooling down to 80°–90° C., is mixed with styrene, in the ratio of 70 parts by weight of polyester and 30 parts by weight of styrene. The resin thus obtained has a pale yellow color.

*Example 3*

The process is carried out as in Example 2, but 1,460 g. of adipic acid are used in place of the phthalic anhydride. The course and rate of reaction are identical, the resin obtained by mixing the polyester with styrene as in Example 2, has a light yellow color.

*Example 4*

The process is carried out as in Example 2, with the same amounts of components, but using instead of the phthalic anhydride, 1,660 g. of isophthalic acid. The resin obtained has the same color as that of Example 2.

*Example 5*

The process is carried out as in Example 2, but using 1,700 g. of propyleneglycol in lieu of 1,364 g. of ethyleneglycol. The resin obtained has a pale yellow color.

Example 6

The process is carried out as in Example 2, but using 2,400 g. of diethyleneglycol in lieu of 1,364 g. of ethyleneglycol. The resin obtained has a pale yellow color.

The resins—by which is meant the polyester-styrene mixtures—obtained according to the invention, have a very low acidity (0–10), which distinguishes them from the usual polyester resins and from those obtained from itaconic acid, which have acidities in the range of 20–40. The acid number is determined by the usual method, by dissolving a 2–3 g. sample of resin in a 50:50 mixture of alcohol-benzene, and titrating the resulting solution with N/10 aqueous potash solution, to a pH value of 6.5–6.6, using bromothymol blue ad indicator. The acid number is given by the formula:

$$\frac{\text{Ml. of NaOH} \times \text{normality} \times 56.1}{\text{Weight of sample}}$$

Moreover, a better stability and a longer storage life are shown by the resin according to the invention. The catalyzed resin is highly reactive. The hardened resin possesses tensile and bending strengths higher than those of conventional polyester resins or of resins obtained from itaconic acid, as well as superior dielectric properties.

The properties of a resin made according to Example 2 are shown below, as an example. The acidity and viscosity have been measured on the non-catalyzed resin; the acidity has been determined in the above described manner, while the viscosity has been measured by the Höppler method. The gel time and max. exothermic temperature have been measured according to standards of the U.S. Society of Plastics Industry. The min. hardening time is the time interval between the temperature of 65.6° C. (150° F.), and the max. exothermic temperature in the determination of this latter according to aforesaid S.P.I. method. The tensile and bending strengths have been measured on the hardened resin according to A.S.T.M. D229/49 method, and the dielectric constant has been measured on the hardened resin according to UNI 3645 method.

The following results have been obtained:

| | |
|---|---|
| Acidity | 8. |
| Viscosity | 1600. |
| Gel time | 4′45″. |
| Min. hardening time | 8′20″. |
| Max. exothermic temperature | 190° C. |
| Tensile strength | 600–700 kg./sq. cm. |
| Bending strength | 800–1200 kg./sq. cm. |
| Dielectric constant | 1.8–2.1. |

In all cases, the yield of polyester is practically stoichiometric.

What we claim is:

1. A process for the manufacture of a copolyester of itaconic acid, comprising heating the methyl diester of itaconic acid with at least one glycol and increasing the rate of ester interchange and subsequent polycondensation by conducting the heating in the presence of at least one additional component selected from the group consisting of adipic acid, isophthalic acid and phthalic anhydride, at a temperature between about 100° and 200° C., and effecting said heating firstly at room pressure and then under a vacuum, said methyl diester of itaconic acid being in a molar ratio from 1:3 to 3:1 to the amount of said additional component.

2. A process according to claim 1, comprising carrying out the heating in the presence of a free radical catalyst selected from the group consisting of aromatic sulphonic acids, zinc, lead, magnesium oxides and borates, and boric acid.

3. A copolyester produced according to the process in claim 1.

References Cited in the file of this patent

UNITED STATES PATENTS

| | | |
|---|---|---|
| 2,012,267 | Carothers | Aug. 27, 1935 |
| 2,255,313 | Ellis | Sept. 9, 1941 |
| 2,435,429 | Evans et al. | Feb. 3, 1948 |
| 2,465,319 | Whinfield | Mar. 22, 1949 |
| 2,820,023 | Cavanaugh et al. | Jan. 14, 1958 |
| 2,839,492 | Caldwell | June 17, 1958 |